United States Patent [19]

Nield et al.

[11] 4,380,621
[45] Apr. 19, 1983

[54] FAST CRYSTALLIZING POLYESTER COMPOSITIONS

[75] Inventors: Eric Nield, Watton-at-Stone; David E. Higgins, Wheathampstead; Mark W. Young, Barbican, all of England

[73] Assignee: Imperial Chemical Industries Limited, London, England

[21] Appl. No.: 210,754

[22] Filed: Nov. 28, 1980

[30] Foreign Application Priority Data

Dec. 12, 1979 [GB] United Kingdom ............... 7942872
Mar. 12, 1980 [GB] United Kingdom ............... 8008298

[51] Int. Cl.$^3$ ..................... C08G 63/16; C08G 63/20
[52] U.S. Cl. .................................. 528/287; 524/605; 528/272; 528/274; 528/275; 528/286; 528/293
[58] Field of Search ............................... 525/2, 3, 4, 5; 528/274, 275, 286, 287, 293, 272; 260/40 R; 524/605

[56] References Cited

U.S. PATENT DOCUMENTS

| | | | |
|---|---|---|---|
| 3,367,926 | 2/1968 | Voeks | 525/5 |
| 3,575,931 | 4/1971 | Sherman | 525/5 |
| 3,740,380 | 6/1973 | Eichers et al. | 525/5 |
| 3,741,936 | 6/1973 | Herwig et al. | 525/3 |
| 4,034,013 | 7/1977 | Lane | 525/64 |
| 4,096,202 | 6/1978 | Farnham et al. | 260/40 R |
| 4,163,100 | 7/1979 | Bier et al. | 525/3 |
| 4,211,686 | 7/1980 | Nishikawa et al. | 260/40 R |
| 4,281,071 | 7/1981 | Fearing et al. | 525/2 |
| 4,282,133 | 8/1981 | Fearing et al. | 260/40 R |

FOREIGN PATENT DOCUMENTS

| | | |
|---|---|---|
| 1300308 | 12/1972 | United Kingdom . |
| 1320399 | 6/1973 | United Kingdom . |
| 1451945 | 10/1976 | United Kingdom . |
| 2015013 | 9/1979 | United Kingdom ............. 260/40 R |
| 2015014 | 9/1979 | United Kingdom ............. 260/40 R |

*Primary Examiner*—Ronald W. Griffin
*Attorney, Agent, or Firm*—Cushman, Darby & Cushman

[57] ABSTRACT

A fast crystallizing polyester wherein the polyester has an intrinsic viscosity of greater than 0.3 and at least 90 mole % of the repeating units of the polyester are residues obtained from aromatic diacids or hydroxyacids and aliphatic diols characterized in that at least some of the acid end groups of the polyester have the formula $-Y^-M^+$ where M is an alkaline metal ion and Y is an anion selected from carboxylate, sulphinate, phosphinate, phosphate, sulphonate, phosphite and borate ions, which ionized end groups have been produced during polymerization of the polyester by either:

(a) copolymerizing units derived from materials of formula $X-R-Y^-M^+$ wherein X is a group capable of being polymerized onto the polyester chain, R is an aliphatic, cycloaliphatic or aromatic group, or (b) polymerizing the polyester in the presence of an alkaline metal salt or corresponding base, the concentration of groups of formula $Y^-M^+$ in the polyester being sufficient to reduce the crystallization peak temperature on heating (Tn) by at least 5° C. in comparison with the same polyester in the absence of the ionic groups. Preferably the alkaline metal is selected from lithium, sodium, potassium and calcium and the polyester contains at least 90 mole % of ethylene terephthalate units.

9 Claims, No Drawings

FAST CRYSTALLIZING POLYESTER COMPOSITIONS

This invention relates to fast crystallising polyester compositions containing difunctional aromatic acids and more particularly to such compositions wherein a major part of the polyester is formed of ethylene terephthalate units.

The commercial development of polyethylene terephthalate, hereinafter termed PET, as a moulding powder for use in injection moulding machines has been hampered because the cycle time for moulding of dimensionally stable articles is somewhat longer than that for other plastics of the engineering type. This is primarily due to the fact that the moulded composition does not reach a crystalline condition as rapidly as the other plastics. Premature ejection from the mould of an insufficiently crystallised moulding would mean that the article could continue to crystallise when in service with appropriate volume changes. A further disadvantage of PET is that it requires the moulds to be maintained at a temperature of at least 120° C. in order to achieve satisfactory results. Whilst a wide variety of nucleants have previously been suggested as being suitable for bringing about rapid crystallisation of polyesters most of these are either inefficient as nucleants or bring about a marked degradation of the polyester under processing conditions. Thus finely-divided inorganic nucleants such as talc are not very efficient nucleants, and efficient nucleants such as sodium benzoate cause marked degradation of polyesters such as polyethylene terephthalate and polytetramethylene terephthalate when the nucleant is melt compounded into the polyester in an extruder.

According to the invention there is provided a fast crystallising polyester wherein the polyester has an intrinsic viscosity of greater than 0.3 and at least 90 mole % of the repeating units of the polyester are residues obtained from aromatic diacids and aliphatic diols characterised in that at least some of the acid end groups of the polyester have the formula $-Y^-M^+$ where M is an alkaline metal ion and Y is an anion selected from carboxylate, sulphinate, phosphinate, phosphate, sulphonate, phosphite and borate ions, which ionised end groups have been produced during polymerisation of the polyester by either:

(a) copolymerising units derived from materials of formula $X-R-Y^-M^+$ wherein X is a group capable of being polymerised onto the polyester chain, R is an aliphatic, cycloaliphatic or aromatic group, or (b) polymerising the polyester in the presence of an alkaline metal salt or corresponding base, the concentration of groups of formula $Y^-M^+$ in the polyester being sufficient to reduce the crystallisation peak temperature on heating (Tn) by at least 5° C. in comparison with the same polyester in the absence of the ionic groups.

The ionised end groups may be introduced into the polyester during polymerisation by reaction of the acid end groups, introduced by way of the acidic components, with an alkaline metal salt or preferably a corresponding base. Alternatively, the ionic end groups may be introduced by the polymerisation of materials of formula $X-R-Y^-M^+$ wherein X, R, Y and M are as hereinbefore specified. Typical of the groups comprising R are aliphatic chains preferably containing at least 6 carbon atoms, one or more fused or separate aromatic rings and cycloaliphatic groups. The aromatic group includes groups selected from 1,4-phenylene, 1,3-phenylene, 1,2-phenylene, 5-sulpho-1,3-phenylene, 2-chloro-1,4-phenylene, 2-bromo-1,4-phenylene, 2-methyl-1,4-phenylene, 2,6-dimethyl-1,4-phenylene, 1,4-cyclohexylene, 4,4-biphenylene, 2,6-naphthylene, 4,4-biphenylene, ethylene dioxybis(1,4-phenylene) and groups of formula:

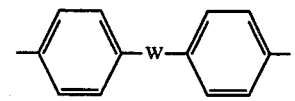

where W is $-O-$, $-CO-$, $-O-CH_2-CH_2-O-$, $-SO_2-$ $-C(CH_3)_2-$ or $-NH-$.

These materials are incorporated into the polyester at concentrations of from 0.05 to 10% (preferably between 0.2 and 5%), by weight of the polyester, using the conventional polymerisation techniques for preparing polyesters. Typical of suitable materials are those of formula:

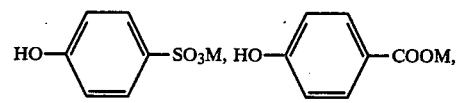

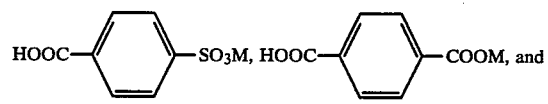

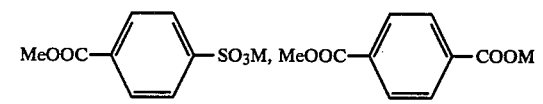

where M is the alkaline metal ion and the groups $-OH$, $-COOH$ and $-COOMe$ are typical of the group X which is capable of being polymerised into the polyester chain.

The preferred alkaline metal is selected from lithium, sodium, potassium and calcium. Sodium is preferred.

The introduction of the ionised $-Y^-M^+$ end groups on the polymer chain during polymerisation permits a lowering of the crystallisation peak temperature (Tn) whilst at the same time substantially reducing the extent to which degradation occurs in comparison with the introduction of ionised end groups into the polymer by reacting with nucleant salt after the polymerisation stage.

In addition, the introduction of the ionised acid groups into the polyesters of the invention results in a polyester which is much more robust in terms of its melt processability than the corresponding polyester containing unneutralised acid end groups. Thus, whereas a reduction in melt viscosity will occur when the latter type of polyester is melt processed, because of degradation of the polymer chain, the polyesters of the invention give a reduction which is no more severe and is generally appreciably less than the unneutralised polyester. The melt processing stability of the polyesters of the invention is at least equivalent to that of the unneutralised polyesters. This enables satisfactory products to be obtained from compounding and fabrication processes under a broader range of processing conditions.

The invention also includes the methods of polymerising the polyesters to produce the polyesters having ionised end groups.

The crystallisation peak temperature (Tn) of the polyesters of the invention may be further reduced by the addition of an acidic compound which is selected from a weak acid or corresponding anhydride, a salt of a weak acid or a salt of a strong acid. The combination of the ionised end group with the acidic compound is believed to result in an ionic association which act as efficient nucleation sites.

The acidic compounds may be organic or inorganic in nature, and can include polymers having acidic groups. Thus, suitable compounds such as substituted benzoic acids, boric acid, copolymers of ethylenically unsaturated acids, such as acrylic acid, methacrylic acid or maleic anhydride, with olefins, and salts of strong acids such as sodium benzene sulphonate. Also suitable for use as the acidic components are the ionisable metal salts of organic compounds described for use for nucleating polyesters by reacting with a preformed polyester in European patent application No. 80301860.5. The concentration of such acidic compounds may be as high as 10% for materials which are polymeric in nature, but generally concentrations of the order of 1% are effective.

The polyester used in the composition of the invention may be any polyester which contains at least 90 mole % of its repeating units as residues of aromatic diacids and aliphatic diols in addition to the specified ionic end groups. Polyesters containing at least 90 mole % of ethylene terephthalate or tetramethylene terephthalate units are particularly suitable as these are readily available and have suitable physical properties for use as engineering polymers. They may be made up wholly of ethylene terephthalate units or may contain minor amounts of copolymerised units which do not substantially alter the character or properties of the homopolymer. On the other hand the polyesters may contain polymeric segments having a glass-transition temperature of less than 0° C. and preferably less than −20° C. so that the character of the polyester is radically changed by internal plasticisation.

The polymeric segments preferably have a molecular weight in the range of 500 to 10,000 and desirably between 1000 and 5000. The polymer used must be capable of undergoing polycondensation with the segments of PET through reactive end groups such as hydroxyl or carboxyl groups or of being linked to PET segments by the use of chain extenders. They must be thermally and chemically stable under the conditions necessary to form the block copolymer. Typically suitable are polyethylene glycol, polyethylene adipate, polypropylene glycol, polybutylene glycol, polybutylene adipate, polycaprolactone, polydecamethylene glycol, polyethylene sebacate, polyethylene azelate and polyoxydiethylene sebacate.

The concentration of the polymeric segments should be between 0.05 and 10 mole %, preferably 0.1 to 5 mole % of the block copolyester.

The block copolyesters containing such segments may be obtained from monomeric constituents of PET and the low glass-transition temperature segments by conventional means. For example, copolymers may be made by heating dimethyl terephthalate, ethylene glycol and the polymeric segment in the presence of an appropriate catalyst at about 200° C. until ester interchange is complete and thereafter heating at 275° C. to effect the polycondensation. Alternatively, a preformed polymer of the polyester or a polyester diol can be compounded under melt conditions with an appropriate reactive polymeric segment. Chain extenders, such as isocyanates, epoxides, phenyl esters and carbonates, may also be included in a melt compounding process. The melt compounding process is also useful for preparing block copolyesters having various concentrations of the polymeric segment from copolyesters having a higher concentration of the polymeric segment. In this "let-down" process PET may be melt blended, for example, with a copolyester of PET containing 10 mole % of polyethylene oxide segments to give a copolyester containing a polyethylene oxide concentration which has been reduced in proportion to the total concentration of ethylene terephthalate units in the final composition.

The use of block copolymers of the type described are particularly useful because such block copolymers have a greater tendency to crystallise rapidly without the need to add an external plasticiser. In the case of PET homopolymers or when there is insufficient of any component in the polyester able to effect internal plasticisation of the polyester it is advantageous to add an external plasticiser. Suitable external plasticisers for use with PET are described in British Patent Applications published as Nos. GB 2 015 013 and GB 2 015 014.

The compositions may also contain a variety of auxiliary additives, for example, for improving the thermal, oxidative and light stability of the polyester or a variety of other additives such as fillers, pigments, colourants, flame retardants and mould release agents. The addition of known nucleating agents are also included in the invention.

The compositions are particularly useful for use in engineering applications when they contain particulate or fibrous fillers because these materials can significantly enhance the mechanical properties of the composition. Of the fibrous fillers, glass fibre is most widely used and are commercially available in a variety of types. The most suitable type for giving optimum levels of mechanical properties will depend to a significant extent on the nature of the size applied to the glass. Manufacturers of glass fibres apply a variety of sizes for promoting bonding between the polymer and the glass. The most suitable glass may be chosen by examination of the properties obtained when the glass is incorporated in the composition or the advice of the glass fibre manufacturer may be sought to obtain a fibre suitable for use in polyester compositions. Suitable glasses are OCF 277B or OCF 419AA, obtainable from Owens Corning Fibreglas. The compositions may contain from 5 to 80% by weight of the composition of glass fibre.

The composition may additionally, or alternatively, contain a variety of mineral fillers such as clays, mica, calcium metasilicate, glass beads, pulverised fuel ash and hollow glass spheres and other materials which act not only as cheap fillers but also significantly enhance some mechanical properties of the composition. As with the glass fibre it is advantageous to use fillers which have been surface treated with adhesion-promoting materials such as silanes.

The compositions of the invention may also include other polymeric materials. The blend of such compositions will normally contain less than 50% of the composition of other polymeric materials. Particularly useful are compositions containing polymeric impact improvers, for example, of the types described in U.S. Pat. Nos. 4,034,013 and 4,096,202. Other suitable impact improvers include ethylene vinyl acetate copolymers.

The fast crystallising characteristics of the compositions of the invention may be determined by subjecting small samples of the composition to differential scanning calorimetry techniques in addition to the practical test of determining the fastest rate at which articles may be injection moulded whilst retaining dimensional stability and good surface properties. The general technique used on small samples to examine the compositions of the present invention was as follows. In order to remove residual crystallinity as far as possible a 10 mg sample of the composition was dried, heated significantly above the melting point of the polyester for 2 minutes and then quenched. For example, the composition may be melt pressed at 300° C. for a known period prior to quenching in liquid nitrogen. The crystallisation properties of the sample may then be examined by heating in a Perkin Elmer DSC-2 machine at 20° C./min until a temperature of 300° C. is reached. For a control sample of PET the trace of the heat changes invovled on heating the sample shows a glass-transition temperature (Tg) in the region of 70° C., a pronounced exotherm, as crystals tend to form from the glassy state, with a peak at about 150° C. (Tn) and a marked endotherm as the polymer melts (Tp) at about 260° C. By comparison with this trace for polyethylene terephthalate a composition according to the invention would have a value for Tn of less than 145° C. and desirably less than 140° C. In practice it has been found that Tn corresponds closely to the temperature at which the peak in the crystallisation curve is reached within 60 seconds under isothermal conditions.

The intrinsic viscosity of the polyesters in the compositions of the invention are determined on a 1% solution of the polyester in o-chlorophenol measured at 25° C.

The invention is further illustrated by reference to the following Examples.

EXAMPLE 1

A sample of polyethylene terephthalate homopolymer having potassium carboxylate end groups was prepared as follows. 50 g of the product of the direct esterification of terephthalic acid with ethylene glycol, 0.01 g antimony trioxide and 0.45 g potassium monomethyl terephthalate were heated at 300° C. under a vacuum of 0.7 mm Hg for 1 hour with stirring. The product was cooled under nitrogen and ground to a powder. The potassium carboxylate end group concentration was calculated as 41 g mole/$10^6$ g of polymer.

1% by weight of the additives shown in the Table below were mixed with this product by grinding in a pestle and mortar. Films were prepared by pressing this product at 280° C. for the periods shown in the Table. The film was used for measurements of Tn as hereinbefore described and for infra-red end group analysis according to the method disclosed in Polymer, Volume 13, 1972, pages 391. The infra-red analysis and the estimated potassium carboxylate concentration enables the intrinsic viscosity to be estimated according to the method described in Transactions of the Faraday Society, Volume 57, 1961, page 150. The results obtained were as follows.

TABLE 1

| Salt | Time in Press (sec) | End Group Analysis (g.moles/$10^6$ polymer) OH | COOH | IV (Estimated) | Tn (°C.) |
|---|---|---|---|---|---|
| Boric acid | 30 | 51 | 37 | 0.51 | 131.5 |
|  | 60 | 52 | 36 | 0.51 | 135.5 |
| Sodium benzene sulphonate | 30 | 51 | 35 | 0.52 | 131 |
|  | 60 | 58 | 40 | 0.48 | 130.5 |
| AC Wax-540A (Ethylene-Acrylic acid copolymer) | 30 | 78 | 30 | 0.45 | 130.5 |
|  | 60 | 104 | 38 | 0.38 | 127.5 |

EXAMPLE 2

A series of ionic-ended polyesters was prepared by reacting terephthalic acid (6 kg) with ethylene glycol (3 liters) in the presence of varying amounts of sodium hydroxide (based on the total reactant concentration) as listed in Table 2 below, using a reaction temperature of 240° C. under a pressure of 40 psi. After a heating period of 3 hours antimony trioxide (3.5 g) and further sodium hydroxide was added, dissolved in a minimum quantity of ethylene glycol. The polymerisation was continued for a further 1.75 hours with the vacuum being steadily reduced to less than 1 mm Hg whilst the melt temperature was increased to 290° C. The crystallisation peak temperature of the compositions were determined as follows. A sample of the product was dried overnight at 110° C. in a vacuum oven. A film (0.375 mm thick) was obtained by pressing the product between PTFE coated stainless steel glazing plates at a pressure of 18 MPa and a temperature of 280° C. After 2 minutes at the required pressure the mould was quenched in an ice bath. About 10 mg of sample was cut from the film and heated in a Perkin Elmer DSC IB machine at a rate of 16° C./minute. The crystallisation peak exotherm (Tn) was recorded.

The melt processing stability of the polymers was assesed using a standard melt flow grader (Davenport Melt Indexer) fitted with a die 8 mm in length with a diameter of 1.18 mm, using a melt temperature of 285° C. using a total load of 2.16 kg. This method of assessment is substantially described in British Standard 2782:7:720A (1979) (Method 105C). Prior to test the polymers were dried at 130° C. for 4 hours in an air oven. The method was applied to the ex-autoclave materials and the same material after it had been passed through a melt extruder at 285° C. The polymers are introduced to the grader which has been preheated to 285° C. and allowed to equilibrate for 5 minutes before the melt flow index is measured. The results obtained are quoted as melt flow index (g/10 minutes emerging from the die) and as the percentage change after the extrusion operation.

The polyesters of the production have a Tn which is at least 5° C. less than the unneutralised polyester and show a melt processing stability which is better than that of the unneutralised polyester as shown in Table 2.

EXAMPLE 3

The procedure of Example 2 was repeated using lithium hydroxide, potassium hydroxide, and caesium hydroxides in a series of polyesters at a concentration to give a metal carboxylate concentration of 2.5 gram equivalents per $10^6$ of polymers. The Tn values recorded in Table 3 were obtained using the procedure given in Example 2.

TABLE 2

| Concentration of added NaOH (ppm) | | Metal carboxylate concentration (g.equiv/10⁶ g) | IV (dl/g) | Tn (°C.) | Melt flow index (g/10 minutes) | | MFI change (%) |
|---|---|---|---|---|---|---|---|
| Initially | After first stage | | | | Ex-autoclave | After extrusion | |
| 0 | 0 | 0 | 0.73 | 148.5 | 8.5 | 13.4 | +58 |
| 50 | 50 | 2.5 | 0.66 | 140.5 | 9.2 | 10 | +8.7 |
| 200 | 200 | 10 | 0.68 | 137 | 11.1 | 11.0 | −0.9 |
| 500 | 500 | 25 | 0.67 | 135 | 9.8 | 9.2 | −6.0 |
| 1000 | 1000 | 50 | 0.66 | 134 | — | — | — |

TABLE 3

| Metal hydroxide | Metal carboxylate concentration (g.equiv./10⁶ g) | IV (dl/g) | Tn (°C.) | Melt flow index (g/10 minutes) | | MFI change (%) |
|---|---|---|---|---|---|---|
| LiOH | 2.5 | 0.72 | 139.5 | 10.1 | 8.8 | −12.9 |
| KOH | 2.5 | 0.72 | 143.5 | 9.6 | 9.1 | −5.2 |
| CsOH | 2.5 | 0.68 | 142.5 | — | — | — |
| NaOH | 2.5 | 0.66 | 140.5 | 9.2 | 10 | +8.7 |

EXAMPLE 4

The general procedure of Example 2 was followed to produce ionic-ended block copolyesters containing various low Tg polyester block segments as indicated in Table 4.

TABLE 4

| Polyester | Added NaOH (ppm) | IV (dl/g) | Tn (°C.) |
|---|---|---|---|
| PET containing 5% by weight PEG1540* | 0 (control) | 0.70 | 133.5 |
| PET containing 5% by weight PEG1540* | 1000 | 0.64 | 126 |
| PET containing 5% by weight PEG1540* | 2000 | 0.65 | 127 |
| PET containing 5% by weight PTMG1000** | 1000 | 0.67 | 128 |
| PET containing 5% by weight PTMG2000*** | 1000 | 0.68 | 123 |

*PEG1540 polyethylene glycol of molecular weight 1540.
**PTMG1000 polytetramethylene glycol of molecular weight 1000.
***PTMG2000 polytetramethylene glycol of molecular weight 2000.

EXAMPLE 5

A polyethylene terephthalate polymer containing 50 g. equivalents/10⁶ g of polymer of sodium carboxylate groups obtained by reaction in the presence of sodium hydroxide was melt compounded in a screw extruder at 280° C. with the various additives listed in Table 5. The materials were examined using the procedure of Example 2 to determine Tn.

TABLE 5

| Extruder additive (% by weight) | Tn (°C.) |
|---|---|
| Nil | 132 |
| 0.39 ortho-chlorobenzoic acid (OCBA) | 125.5 |
| 1.0 bisphenol S | 129 |
| 1.0 AC Wax 316* | 128.5 |

*AC Wax 316 is an oxidised polyethylene containing carboxylic acid groups.

EXAMPLE 6

The general procedure of Example 2 was repeated except in that the sodium hydroxide added during the polymerisation was replaced by the additives shown in Table 6. The additive concentrations are given as % by weight of the total reactants. The IV and Tn values (determined as described in Example 2) are recorded.

TABLE 6

| Autoclave additive | IV (dl/g) | Tn (°C.) |
|---|---|---|
| 0.5% sodium benzoate | 0.65 | 130.5 |
| 1.0% sodium o-chlorobenzoate | 0.69 | 124 |
| 1.0% sodium tetraborate | 0.51 | 130 |
| 1.0% calcium silicate | 0.55 | 130 |

EXAMPLE 7

The general procedure of Example 2 was followed using 0.2% by weight of sodium hydroxide together with the additives listed in Table 6. Tn values, determined as described in Example 2 are also listed.

TABLE 7

| Polymer | Additives during polymerisation | | IV (dl/g) | Tn (°C.) |
|---|---|---|---|---|
| PET | 0.2% NaOH | | 0.645 | 132 |
| PET | 0.3% NaOH + | 1% disodium terephthalate | 0.515 | 127.5 |
| | | 1% disodium isophthalate | 0.543 | 128.0 |
| | | 1% disodium orthophthalate | 0.509 | 130.0 |
| | | 1% bisphenol S | 0.452 | 128.5 |

We claim:
1. A fast crystallizing polyester wherein the polyester has an intrinsic viscosity of greater than 0.3 as measured on a 1% solution of the polyester in o-chlorophenol at 25° C. and at least 90 mole % of the repeating units of the polyester are selected from ethylene terephthalate or tetramethylene terephthalate units in which at least some of the acid end groups of the polyester have the formula —$Y^-M^+$ where M is an alkaline metal ion and Y is a carboxylate anion, which ionised end groups have been produced during polymerization of the polyester by reaction of an alkaline metal salt or corresponding base with acid end groups of the polyester produced during the polymerization.

the concentration of groups of formula $Y^-M^+$ in the polyester being sufficient to reduce the crystallization peak temperature on heating (Tn) by at least 5° C. in comparison with the same polyester in the absence of the ionic groups.

2. A fast crystallizing polyester according to claim 1 in which the melt processing stability of the polyester is at least equivalent to the melt processing stability of the same polyester in the absence of the ionic groups.

3. A fast crystallizing polyester according to either of claims 1 or 2 in which the concentration of ionised end groups in the polymer is at least 2.5 grams equivalents per $10^6$ gram of polymer.

4. A fast crystallizing polyester to claim 1 in which the alkaline metal ion is selected from lithium, sodium, potassium or calcium.

5. A method of producing a fast crystallizing polyester comprising polymerising a polyester from reactants to produce a polyester containing at least 90 mole % of repeating units selected from ethylene terephthalate or tetramethylene terephthalate units wherein the polymerisation is conducted in the presence of sufficient of an alkaline metal salt or corresponding base the anion of which reacts with the polymer produced during the polymerisation to give a polyester having a crystallisation peak temperature on heating (Tn) at least 5° C. lower than the same polymer produced in the absence of the alkaline metal salt or corresponding base.

6. A fast crystallising polyester composition characterised in that it contains a polyester prepared by the method of claim 4 and an acidic compound selected from a weak acid or corresponding anhydride, a salt of a weak acid or a salt of strong acid.

7. A polyester composition according to claim 6 wherein the acidic component is selected from substituted benzoic acis, salts of substituted benzoic acids and copolymers containing ethylenically unsaturated acids.

8. A polyester composition according to either of claims 6 and 7 containing from 5 to 80% by weight of the composition of a particulate or fibrous filler.

9. A method according to claim 4 wherein there is sufficient alkaline metal salt or corresponding base to produce a polymer containing at least 2.5 gram equivalents of ionised end groups per $10^6$ of polymer.

* * * * *